W. C. BUCKNAM.
CUTTING MACHINE.
APPLICATION FILED JAN. 23, 1920.

1,365,021.

Patented Jan. 11, 1921.
4 SHEETS—SHEET 1.

INVENTOR
BY
ATTORNEYS

W. C. BUCKNAM.
CUTTING MACHINE.
APPLICATION FILED JAN. 23, 1920.

1,365,021.

Patented Jan. 11, 1921.
4 SHEETS—SHEET 3.

INVENTOR
Worthy C. Bucknam
BY
ATTORNEY

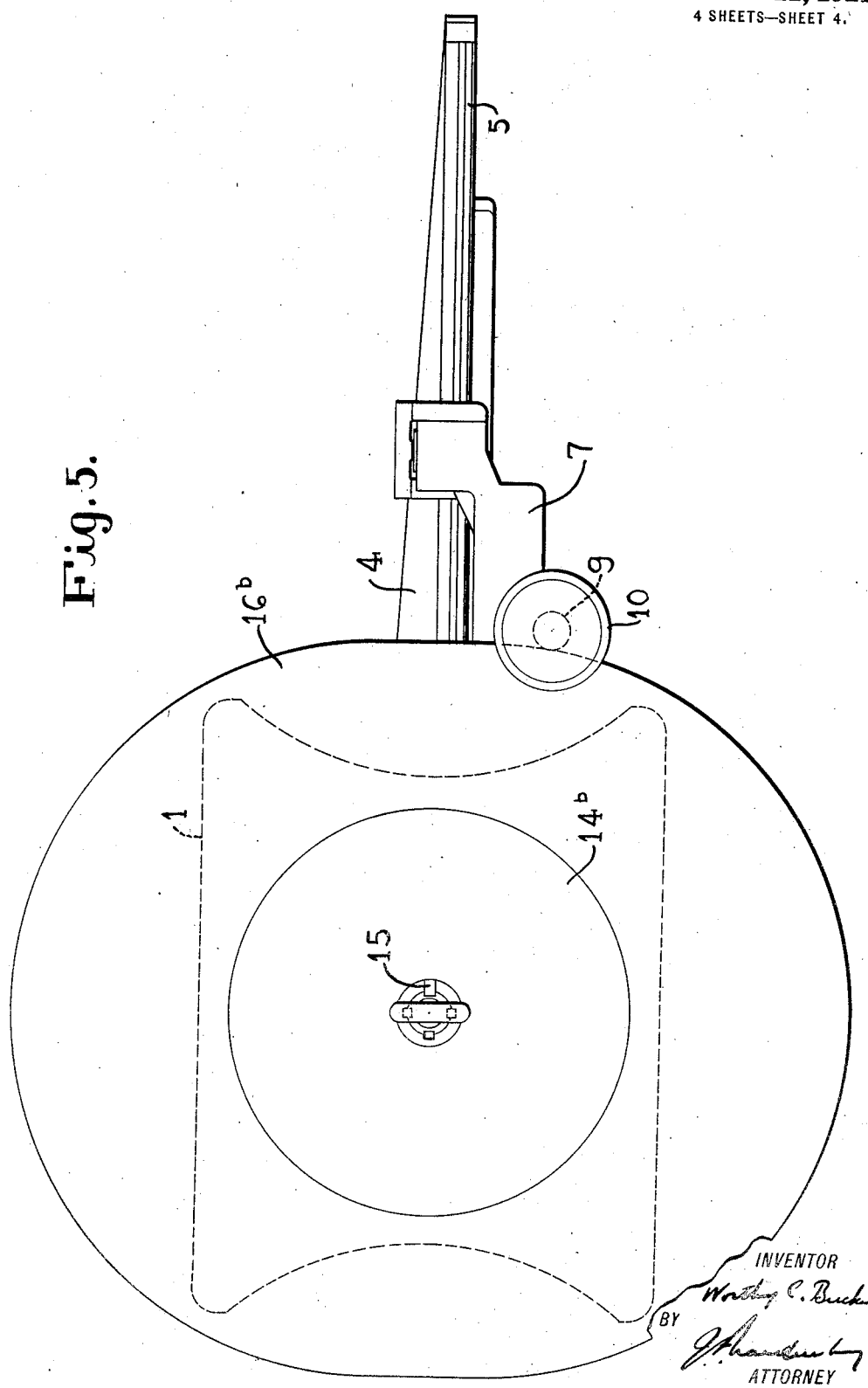

UNITED STATES PATENT OFFICE.

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

CUTTING-MACHINE.

1,365,021.  Specification of Letters Patent.  Patented Jan. 11, 1921.

Application filed January 23, 1920. Serial No. 353,448.

*To all whom it may concern:*

Be it known that I, WORTHY C. BUCKNAM, a citizen of the United States, and resident of Jersey City, in the county of Hudson and State of New Jersey, have invented a new and useful Cutting-Machine, of which the following is a specification.

The invention relates to apparatus for cutting sheets, plates and the like by means of the oxygen jet accompanied by an oxyacetylene, oxyhydric or equivalent heating flame, as embodied in familiar cutting torches. The machine disclosed herein embodies the inventions of my prior Patents 1,059,329 of April 15, 1913 and 1,324,005 and 1,324,007 of December 2, 1919. The object is to provide a machine for cutting automatically by aid of a templet on the order of the one shown in Patent 1,324,007, but capable of a greater variety and range of work. The machine now devised is capable, for example, of cutting out a boiler head or other large piece of circular or other outline, and of cutting therein all the openings that may be required of different shapes and sizes and in different locations radially and circumferentially.

In the accompanying drawings forming a part hereof:

Fig. 5 is another plan showing a templet which encircles the pivotal axis.

Figure 1:
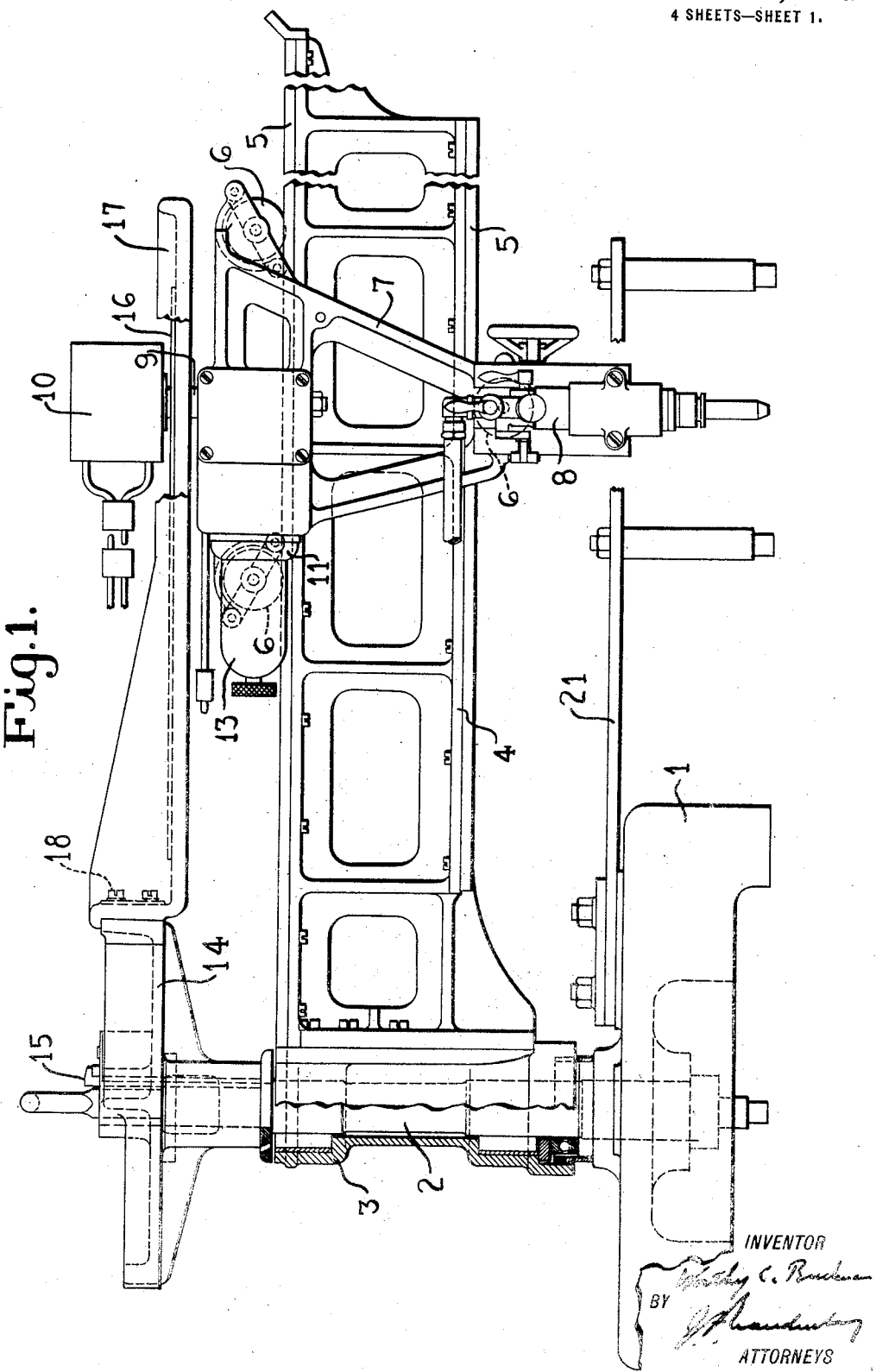
Figure 1 is a side elevation of the machine with portions broken away and in section.

The machine has a base 1 adapted to rest either upon the work or at one side of it, and a pivot post 2 rising from the base. The hub portion 3 of a rigid radial arm 4 is mounted rotatably upon suitable bearings upon the post, so that the arm can swing entirely about the center. Said arm is formed with upper and lower tracks 5 engaged by rollers 6 of a carriage 7, which is thus movable without restraint longitudinally of the arm. A downwardly directed cutting torch 8 is adjustably mounted upon the lower part of the carriage, below and at one side of the radial arm 4. Directly over the torch and above the radial arm, on the upper part of the carriage, is a vertical axis feed roller 9 adapted to coöperate with the inner or outer boundaries of a variety of templets. This feed roller or tracer is preferably magnetized in the manner disclosed in my Patent 1,324,007 aforesaid, so as to adhere to the templet. The coil for energizing the roller is housed in the casing 10. This roller is driven by an electric motor 11 on the carriage through gearing 12, not necessary to illustrate in detail. The speed of the drive can be varied by a governor 13 or otherwise.

Figure 2:
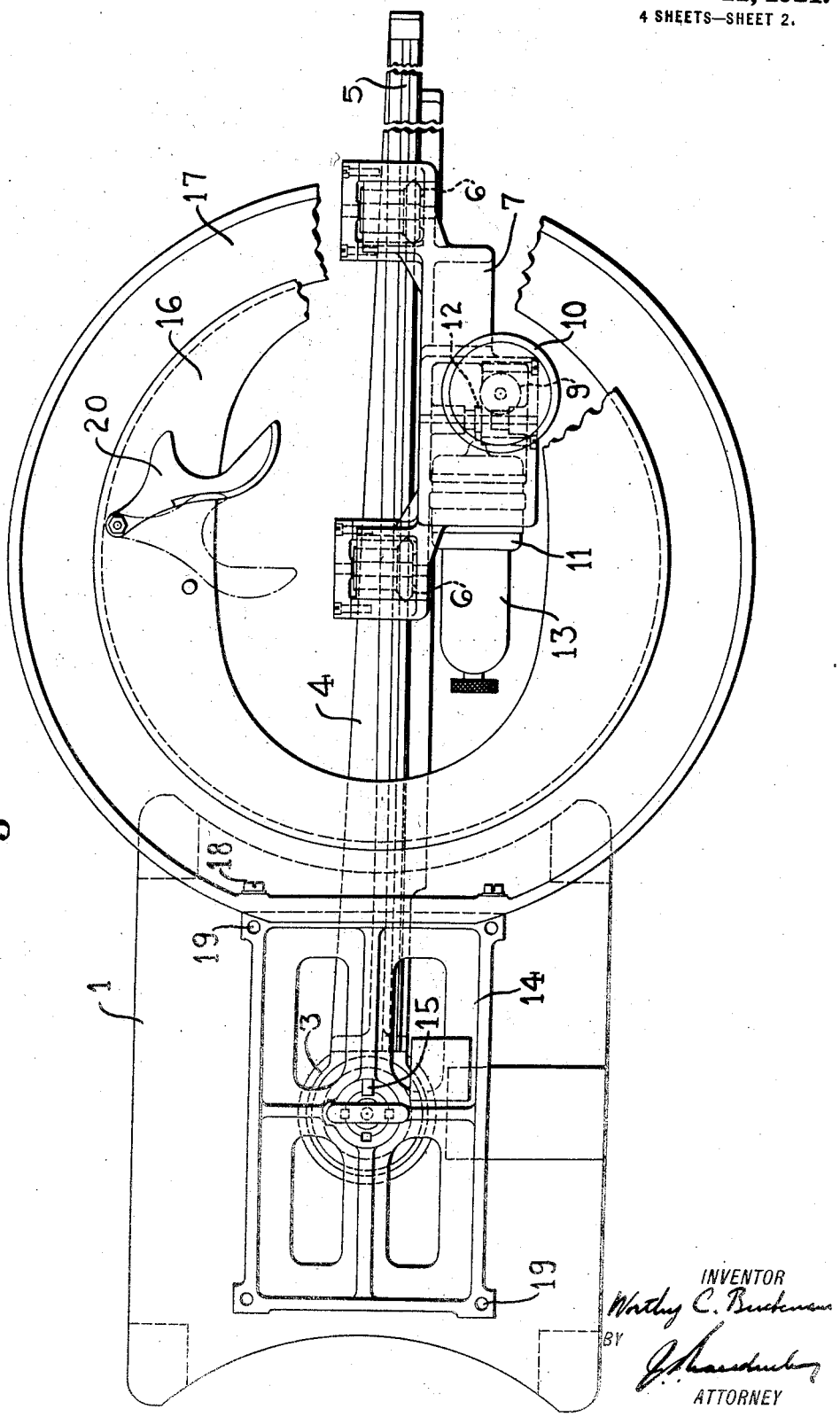
Fig. 2 is a top plan with a portion of the templet ring and templet broken out.
Figure 3:
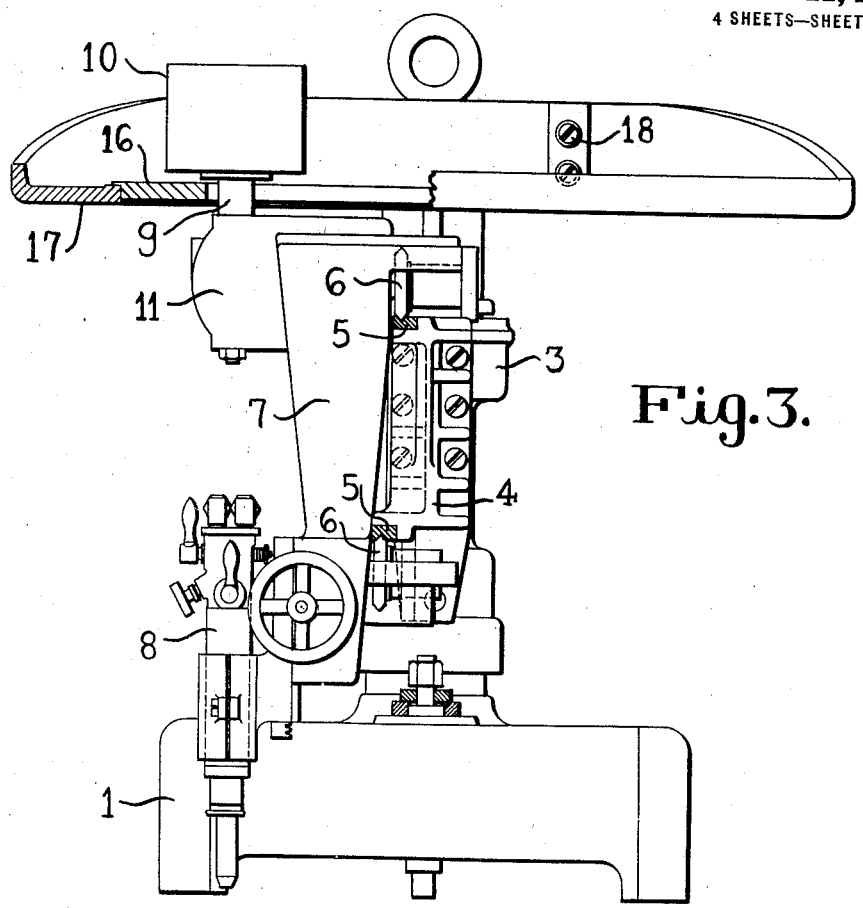
Fig. 3 is a front end elevation with the arm and a part of the templet and templet ring in vertical section.
Figure 4:
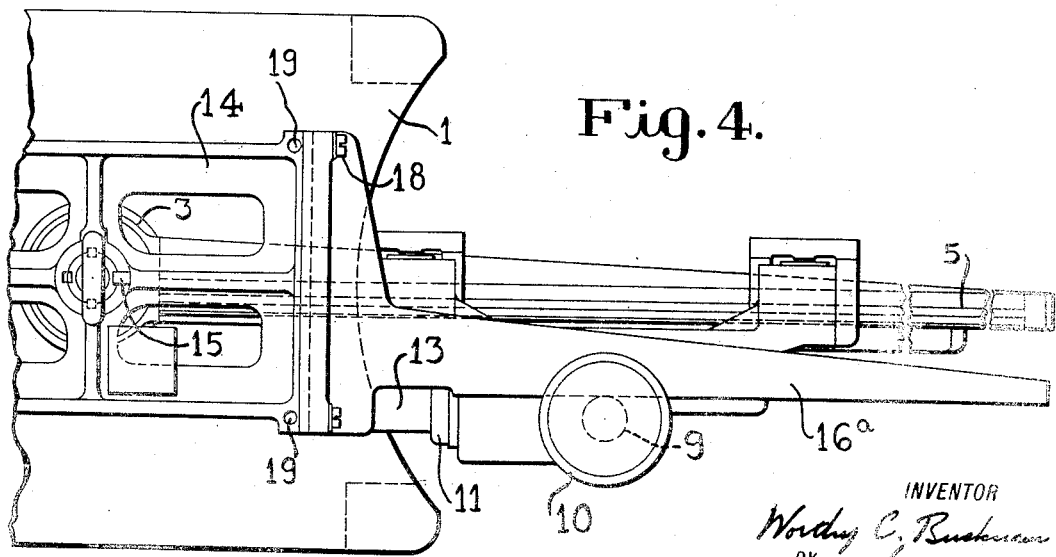
Fig. 4 is a plan view illustrating the use of a straight templet.

A templet supporting head 14 is mounted upon the upper part of the post 2, above the arm 4. This head can be removed or turned to a variety of positions, where it is held by a key 15. Internal templets, such as the one designated 16 in Figs. 1 to 3, are held removably in an annular holder 17 detachably secured by screws 18 to the head 14, by which it is supported in overhanging relation above the arm and carriage. Numerous templets, having different sizes and shapes of opening, can be placed interchangeably in the holder, and larger or smaller holders may be provided for different ranges of templets. If desired, templets can be arranged to be bolted to corner openings 19 in the head. The torch can be caused to cut along straight lines by substituting a straight-edge templet 16$^a$ for the holder 17, as seen in Fig. 4. External templets, such as the templet 16$^b$ of Fig. 5, can be supported on the post with their peripheries extending in a circuit around the pivotal axis. Thus organized, the machine will cut entirely around the center. A number of different sizes and shapes of such templates can be supported upon a circular head 14$^b$, which takes the place of the removable head 14 of the other views.

The templets may be provided with a switch piece 20 for starting the cut in the portion of the metal which would be scrapped, substantially as disclosed in my Patent 1,324,007. A detachable gage 21 may be used in connection with the base to coöperate with holes in the work for locating the cut.

What I claim as new is:

A gas-cutting machine comprising the combination of a pivot post, a rigid radial guide arm swung thereon, a carriage movable freely in and out on said arm, a downwardly directed cutting torch carried by the carriage below the arm whereon the carriage moves, mechanical driving means terminating in a vertical axis feed roller on the carriage above the arm, and means for supporting a variety of templets over the arm for coöperation with said roller.

WORTHY C. BUCKNAM.